Feb. 26, 1924.                                                          1,484,881
                         J. H. W. GILL
              PROPULSION AND MANEUVERING OF VESSELS
                   Filed Oct. 25, 1920      5 Sheets-Sheet 1

Inventor
J. H. W. Gill,
By Watson, Coit, Morse & Grindle
Attorneys.

Feb. 26, 1924.

J. H. W. GILL 1,484,881

PROPULSION AND MANEUVERING OF VESSELS

Filed Oct. 25, 1920   5 Sheets-Sheet 2

Feb. 26, 1924.                                               1,484,881
                         J. H. W. GILL
                PROPULSION AND MANEUVERING OF VESSELS
                  Filed Oct. 25, 1920      5 Sheets-Sheet 4

Inventor
J. H. W. Gill,
By Watson, Coit, Morse & Grindle
Attorneys.

FIG. 15.

Patented Feb. 26, 1924.

1,484,881

UNITED STATES PATENT OFFICE.

JAMES HERBERT WAINWRIGHT GILL, OF HEACHAM, ENGLAND, ASSIGNOR TO GILL PROPELLER COMPANY LIMITED, OF KING'S LYNN, NORFOLK, ENGLAND, A COMPANY OF GREAT BRITAIN.

PROPULSION AND MANEUVERING OF VESSELS.

Application filed October 25, 1920. Serial No. 419,260.

*To all whom it may concern:*

Be it known that I, JAMES HERBERT WAINWRIGHT GILL, subject of the King of England, residing at Heacham, Norfolk, in England, have invented certain new and useful Improvements in the Propulsion and Maneuvering of Vessels, of which the following is a specification.

This invention relates to apparatus for the propulsion steering or maneuvering of vessels by the reaction effect of water jets and has for its object to provide a construction which while available for general purposes is more particularly adapted for use with vessels navigating in shallow waters where weed and the like may be encountered.

According to this invention a rotary or other pump is enclosed in a cylindrical casing which is rotatably mounted in a well so disposed within the vessel that the lower end opens through the bottom or other outside wall of the vessel. In the outer end of the rotatable casing is an intake opening for the pump and either one or two delivery passages which in the case of two such passages lead in the same direction from either side of the intake which is then disposed centrally. The well or trunk is formed within the hull of the vessel and is positioned at any convenient place. The cylindrical casing is so mounted within this well that it can be rotated by hand or other mechanism. Where two delivery passages lead from the outer end of the rotatable casing they are preferably arranged to deliver parallel streams of water and are positioned equidistant from the centre of the casing so that the discharge reaction is balanced about the axis of the casing. The mechanism for driving the pump is so constructed and arranged that while the casing is being rotated water can be continuously delivered through the single or twin passages irrespective of the position into which these passages and the casing are turned and set. Thus if the pump is arranged with the discharge opening or openings through the bottom of a surface vessel the latter can be propelled forwards or backwards and also sideways or at any angle.

The jet orifice at the end of each delivery passage is directed preferably horizontally and lies only a short distance beyond the outer wall of the vessel so that if placed in the bottom the draught of the vessel is only slightly if at all increased thereby and thus by suitable construction of the hull a vessel may be provided which is adapted for navigation in very shallow waters. The orifice of the intake opening is preferably curved or rounded off in a direction opposite and parallel to the direction in which the delivery passage or passages lie. In some cases however the rounding off of the intake opening may be in both directions. While this orifice preferably is flush with the outer wall of the vessel, that is to say, with the outer end of the rotatable casing, in some instances a short projecting curved part may be provided and arranged oppositely to the delivery passage or passages.

The invention may be carried out in practice in various ways according to the type of vessel to which it is applied and the details of construction may be varied as found desirable. The accompanying drawings illustrate by way of example how the invention may be applied to a vessel for the purpose of enabling it to be propelled and steered or maneuvered on the surface of the water. The drawings also show examples of alternative constructions of the apparatus. In these drawings.

Like letters indicate like parts throughout the drawings.

Figure 7:
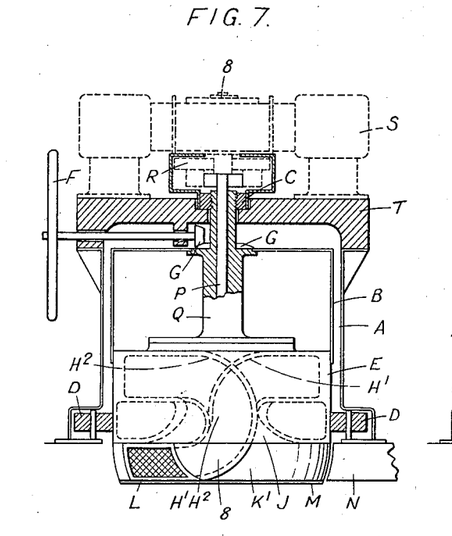
Figure 7 is a part sectional elevation of one construction of pump such as may be employed in a vessel as illustrated in Figures 1 to 6.
Figure 8:
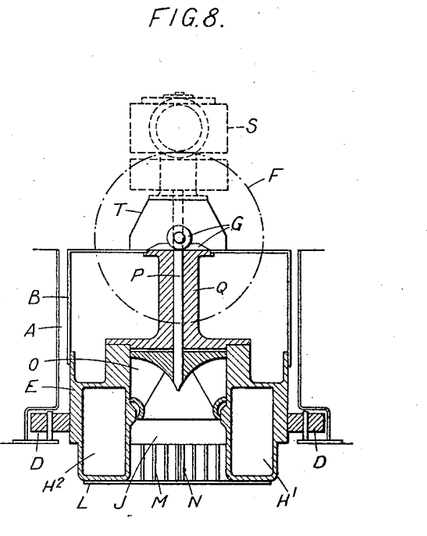
Figure 8 is a section on the line 8—8 of Figure 7.

Referring to Figures 7 and 8 the well A is circular in cross section and is suitably disposed in the hull of the vessel with its lower end opening through the bottom of the vessel but flush therewith. Within the well is a cylindrical casing B which is rotatably mounted on a bearing collar C and with centering rollers D so that both thrust and bearing pressures are taken up. The casing B together with the pump E is adapted to be rotated by a hand wheel F operating through bevel gear wheels G. Alternatively other mechanism may be employed for this purpose and arranged so that the rotation of the casing can be effected from some convenient part of the ship. The body E of the pump, which in this instance and preferably is of the rotary type, is mounted in the lower part of the casing B and the discharge passages $H'$ and $H^2$ from the pump are carried down so as to deliver two parallel streams of water in the same horizontal direction below the bottom of the vessel. The discharge orifices are positioned equidistant from the centre of the pump and on either side of the inlet opening J. The backs of those parts of the discharge passages which lie below the bottom of the vessel are tapered off as at $K'$ $K^2$ to form cut waters so as to reduce resistance. The central intake opening J is covered in by a bottom plate L and guarded by gratings M both at the forward or main intake side and also at the after side between the orifices of the discharge passages $H'$ and $H^2$. Fixed centrally on the bottom of the vessel and on the forward side of the rotatable member is a plate N whose after end lies near to but does not touch that part of the pump body with the inlet and discharge orifices which projects below the bottom of the ship. When the casing B with the pump body is rotated the plate N acts as a scraper to remove from the gratings M any substances such as weed that may accumulate thereon.

The rotor O of the pump is carried on a vertically arranged spindle P which passes through a cylindrical extension of the pump cover Q. The upper part of this extension carries one of the gear wheels G through which the casing B is rotated. The pump rotor is driven through a form of epicyclic gearing in a gear box R from an engine S of suitable type, which in this instance is mounted on a fixed base or bridge piece T which extends over the top of the well A and the upper part of the rotatable casing B. The casing of this gear box R is attached to the pump casing B in order to eliminate the tendency of the pump casing to rotate in the direction of the impeller, due to the internal fluid friction in the pump.

Figure 1:
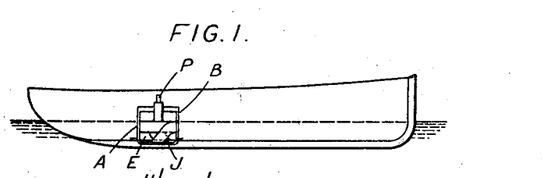
Figure 1 is a longitudinal sectional elevation of a vessel having the present invention applied thereto the construction providing for the delivery of twin jets for effecting propulsion, steering or maneuvering.
Figure 2:
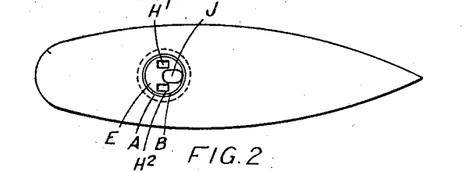
Figure 2 is an under-side view of the same.
Figure 3:
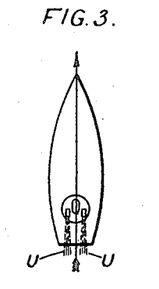
Figure 3 is a diagrammatic plan illustrating the operation of the invention when the ship is being propelled ahead and on a straight course.
Figure 4:
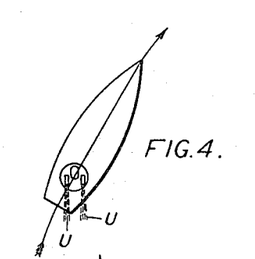
Figure 4 is a similar view showing the operation of the invention when the ship's course is being directed to starboard.
Figures 5, 6:
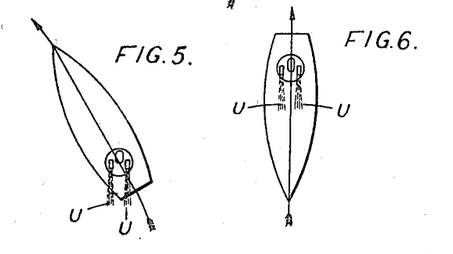
Figure 5 is a similar illustration but showing the ship's course being deflected to port.
Figure 6 is again a similar view showing the vessel being propelled astern.

Referring now to Figures 1 and 2 the disposition of the apparatus in a vessel is here shown. When the pump is put into operation jets of water U will be delivered through the discharge passages $H'$ $H^2$ and if the rotatable casing B is suitably positioned these jets, as shown in Figure 3, will be directed astern and the vessel will be propelled ahead on a straight course. If now the casing B be turned so that the jets U are directed to starboard, the ship's head will be turned to starboard as shown in Figure 4. On the other hand if the casing is rotated in the opposite direction so as to direct the jets to port the vessel will turn to port as shown in Figure 5. If it is desired to go astern the casing U is rotated through 180° until the jets U are directed forward as shown in Figure 6 when the vessel will be propelled astern.

Figure 9:
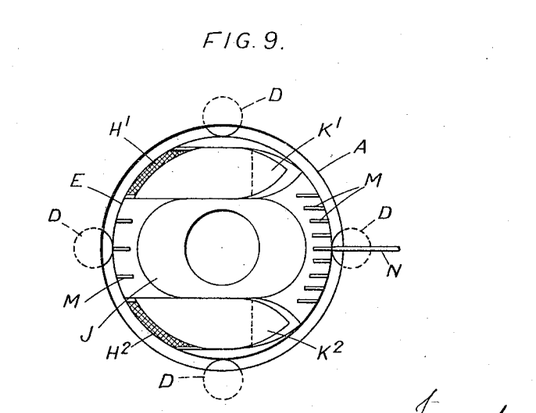
Figure 9 is an under-side view of the apparatus shown in Figures 7 and 8.
Figure 10:
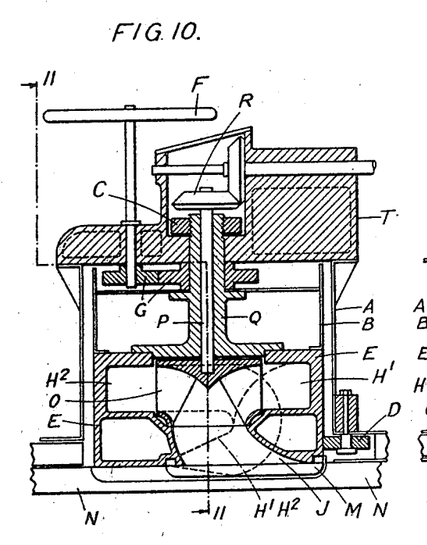
Figure 10 is a sectional elevation of a modified construction of pump.
Figure 11:
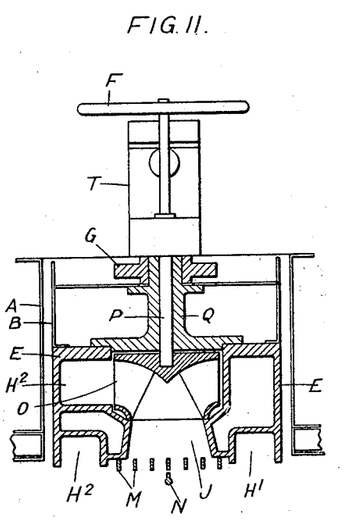
Figure 11 is a section on the line 11—11 of Figure 10.
Figure 12:
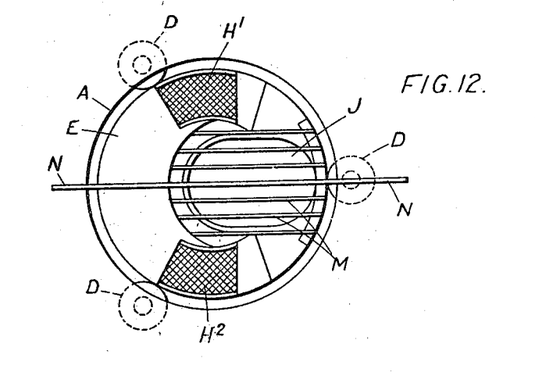
Figure 12 is an under-side view of the apparatus illustrated in Figures 10 and 11.

In the construction illustrated in Figures 10, 11 and 12 the inlet passage J and the ends of the discharge passages $H'$ and $H^2$ are arranged so as to project to the least possible extent below the bottom of the vessel which is thus adapted for navigation in shallow waters. In this case the ends of the discharge passages $H'$ and $H^2$ open through the bottom of the pump casing and are not directed horizontally as in the construction shown in Figures 7, 8 and 9. The inlet J also opens directly through the bottom of the pump casing and the cover plate L is here omitted, a grating M being arranged on the under side of the pump casing over the inlet. The scraper plate N extends over the bottom of the pump casing and is fixed to the bottom of the ship both on the forward and aft sides of the casing.

In this instance the hand wheel F with its spindle is arranged vertically and an ordinary toothed wheel and pinion G are employed between the hand wheel spindle and the extensions from the pump cover plate Q for the purpose of rotating the casing B and pump body E. In place of the engine being mounted on the base T over the top of the well and casing, this engine, which is not shown in the drawings, is mounted beside the well in some convenient position within the ship and the drive is transmitted through the bevel wheels R to the spindle P which carries the rotor O.

An internal combustion engine is preferably used to drive the pump and this may be arranged as shown in Figure 7 with the cylinders horizontal or the cylinders may be vertical or otherwise as found convenient.

It will be seen that by means of this construction the propulsion, steering and maneuvering of the ship can be performed by the twin streams of water delivered from the discharge passages H' H² by a unit type of rotatable pump or hydraulic propeller. The outboard ends of the pump passages are so designed as to offer the least resistance to the propulsion of the vessel and the manner in which the pump is mounted in the well enables it to be rotated in any direction. The arrangement not only avoids unnecessary resistance to propulsion but provides against the carrying of "dead water" owing to the arrangement of the displacer casing B on the pump in the well. In the design of the pump itself, the passages H' and H² are arranged so as to provide for a regular acceleration of the water with a view to avoiding the unnecessary conversion of kinetic energy into pressure energy, since it is the quantity of water acted upon and not the generation of "head" which is the essential factor in obtaining propulsive efficiency. The arrangement of the discharge passages also minimizes eddy losses as far as possible and balances the reaction of the discharge streams about the centre of the pump.

Figure 13:
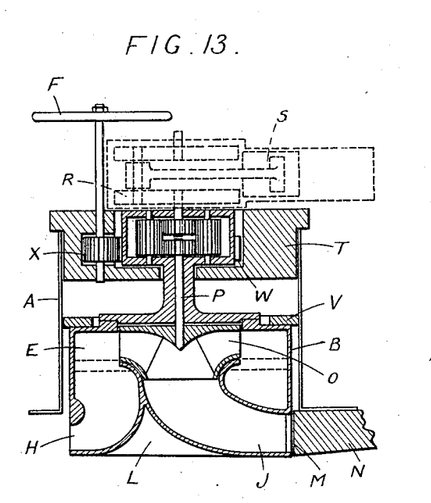
Figure 13 is a sectional elevation of a modified construction of pump illustrating the case in which the propulsion, steering or maneuvering is effected by the delivery of a single jet.
Figure 14:
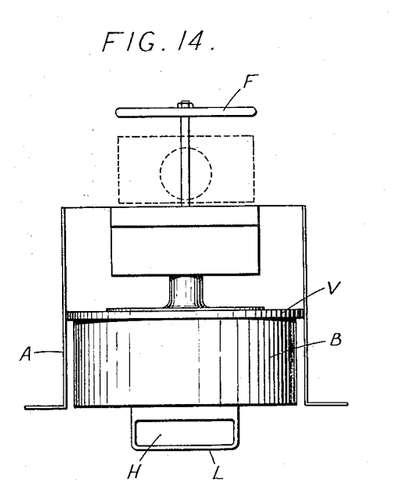
Figure 14 is an elevation of the pump body according to the modification shown in Figure 13, the well being shown in section.

Referring to the modified single jet construction shown in Figures 13 and 14, it will be seen that in this case the intake opening J faces in a direction exactly opposite to that in which the single water jet is radially delivered. The pump E discharges into a scroll shaped chamber or annulus with guide vanes, from which the water passes downwards into a collecting chamber surrounding the intake pipe at its inner end and is delivered through a curved nozzle H. This nozzle is of the flattened form shown in Figure 14, which shows a view of the pump body from the discharge end, to economize draught and to make the width of the nozzle approximately equal to that of the intake opening. The bottom plate L is in this case made of trough form and encases the two passages thus formed outboard, to prevent eddies being formed round the curved under surfaces of these passages. The intake opening J is provided, as in the other construction, with a grating M and a scraper plate N.

The pump body is suspended from a transverse bridge piece T by means of a gear box R carrying a form of epicyclic gear, which transmits power from the engine S to the pump spindle P and serves to balance the frictional tendency of the water in the pump to rotate the pump body. On the top of the casing B is a ring of wood or other material or a series of rollers V, to keep the pump body centered and to assist in taking the thrust of the propulsion. Round the outside of the gear box is a toothed ring W with which is meshed a pinion X on the vertical shaft of the steering hand wheel F, which controls the rotation of the casing and the jet. In the construction illustrated in Figures 13 and 14 the engine S is shown mounted on the transverse bridge piece T, as in the construction illustrated in Figures 7 and 8, but this engine may also be separately mounted and connected to the pump spindle through gearing or otherwise, as in the case illustrated in Figures 10 and 11. The remaining parts of the apparatus are as described in the previous construction.

The well A and casing B are carried up to a height which is above the normal water line of the ship so that risk of water entering the hull by way of the clearances between the wall of the well and the separately rotatable parts is obviated.

It is to be noted that the invention may be used to assist in the propulsion, steering or maneuvering of a vessel provided with screws or paddles.

If desired more than one pump may be employed and they may be suitably disposed so as to draw water in and deliver it through rotatable intake and delivery passages arranged as described. In some cases the pump or pumps may be driven by steam or electric power.

In the case of a small installation and where some light type of internal combustion engine is employed for driving the pump this engine may be mounted directly or indirectly on an inboard extension of the pump casing so as to be rotated with it. The complete pump unit with the engine is then mounted so as to enable the stream or streams of water to be delivered in any direction as desired, a tiller or other device being employed for rotating the pump. The tendency of the pump casing to rotate in the direction of the impeller, due to internal fluid friction in the pump, is completely obviated by this arrangement.

The construction of the well and the manner of mounting the rotatable casing and pump therein, are preferably such that the pump and the casing and also the engine, if mounted on the pump casing, may if desired be removed from the well while the vessel is afloat and transferred to another vessel also provided with a well.

Figure 15:
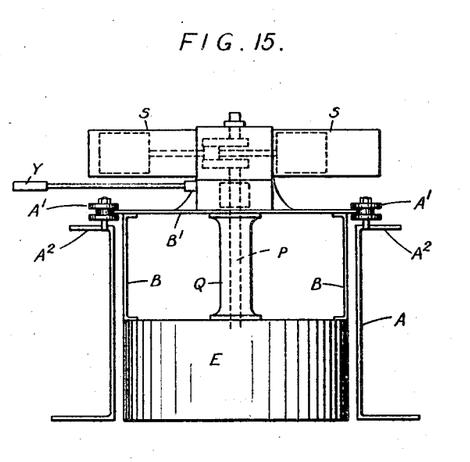
Figure 15 is a sectional elevation of a further modification of the invention.

Such an arrangement is illustrated in Figure 15 in which grooved rollers A' carried on a flange A² on the fixed well A serve to support the casing B which, as in the previous constructions, carries the pump E. The upper end of the casing B is closed by a plate B' which carries the engine S, the drive from the engine being transmitted to the pump rotor through a spindle B disposed within the extension Q of the pump cover plate. A tiller Y is provided by means of which the casing B can be rotated. The engine S is thus rotated together with the casing B, and the engine S, the casing B and the pump E together form a propulsive unit which is easily removable from the well A and transferable to other vessels similarly provided with a well.

The construction according to this invention, in which two delivery passages are used, is not limited to the case where these passages terminate in orifices disposed at or near the ends of a diameter of the casing. These passages may be carried round arcs, the jets thus being brought close together at the discharge end of the casing. Again, it is not necessary to the invention, although usually preferable, for the orifices to be of equal size. They may if desired, possibly to assist in securing good balance, be made of unequal size.

What I claim as my invention and desire to secure by Letters Patent is:—

1. In apparatus for the propulsion, steering or maneuvering of vessels by the reaction effect of water jets, the combination with the hull of a vessel having a well therein opening to the exterior of the vessel through a port in its wall, of a water pump positioned entirely within said well, conduits for leading water to and from said pump through said port, the discharge conduit being so formed as to direct the stream of issuing water at all times in a direction substantially parallel to the ship's wall, and means for rotating the discharge conduit about an axis substantially normal to the ship's wall for the purpose set forth.

2. In apparatus for the propulsion, steering for maneuvering of vessels by the reaction effect of water jets, the combination with the hull of a vessel having a well therein opening to the exterior of the vessel through a port in its wall, of a water pump positioned entirely within said well, conduits for leading water to and from said pump through said port, said conduits being rigidly secured together and the discharge conduit being so formed as to direct the stream of issuing water at all times in a direction substantially parallel to the ship's wall, and means for rotating the conduits simultaneously about a given axis substantially normal to the ship's wall, for the purpose set forth.

3. In apparatus for the propulsion, steering or maneuvering of vessels by the reaction effect of water jets, the combination with the hull of a vessel having a well therein opening to the exterior of the vessel through a port in its wall, of a casing rotatably supported within said well, a water pump within said casing, conduits within said casing for leading water to and from said pump through said port, the discharge conduit being so formed as to direct the stream of issuing water at all times in a direction substantially parallel to the ship's wall, and means for rotating the casing and discharge conduit about an axis substantially normal to the ship's wall, for the purpose set forth.

4. In apparatus for the propulsion, steering or maneuvering of vessels by the reaction effect of water jets, the combination with the hull of a vessel having a well therein opening to the exterior of the vessel through a port in its wall, of a cylindrical casing rotatably mounted in the well, a pump enclosed within the casing and having a central intake opening in the outer end of the casing, the pump being positioned entirely within the well, two delivery passages from the pump leading in the same direction through the outer end of the casing and on either side of the central intake, said delivery passages discharging streams of water substantially parallel to the ship's wall and in the same direction.

5. In apparatus for the propulsion, steering or maneuvering of vessels by the reaction effect of water jets, the combination with the hull of a vessel having a well therein opening to the exterior of the vessel through a port in its wall of a pump mounted in the well, conduits for leading water to and from said pump through said port, the discharge conduit being so formed as to direct the stream of issuing water at all times in a direction substantially parallel to the ship's wall, means for rotating the discharge conduit about an axis substantially normal to the ship's wall, a source of power and means for driving the pump from the source of power so that the running of the pump will not be interrupted when the casing is rotated.

6. In apparatus for the propulsion, steering or maneuvering of vessels by the reaction effect of water jets, the combination with the hull of a vessel having a well therein opening to the exterior of the vessel through a port in its wall, of a propulsive unit supported within the well in such manner as to be quickly removable therefrom, said propulsive unit comprising a pump supported entirely within the well and conduits for leading water to and from the pump through the port in the wall of the vessel.

7. In apparatus for the propulsion, steering or maneuvering of vessels by the reaction effect of water jets, a well disposed within the vessel with one end opening through the wall of the vessel, a cylindrical casing rotatably mounted in the well, a pump enclosed within the casing and having a water intake opening in the outer end of the casing, means for causing water from the pump to be delivered through the outer end of the casing, means for rotating the casing, a source of power mounted on the cylindrical casing and rotatable therewith and means for driving the pump from the source of power as set forth.

8. In apparatus for the propulsion, steering or maneuvering of vessels by the reaction effect of water jets, a well disposed within the vessel with one end opening through the wall of the vessel, a cylindrical casing rotatably mounted in the well and containing a complete propulsive unit comprising a pump, a central intake opening for the pump in the outer end of the casing and two delivery passages from the pump leading in the same direction through the outer end of the casing, these passages and their orifices being placed symmetrically about the central intake to effect a balancing of the reactions, this complete propulsive unit being capable of being withdrawn from the well, means for rotating the said casing, a source of power mounted on the cylindrical casing and rotatable therewith, and means for driving the pump from the source of power as set forth.

9. In apparatus for the propulsion, steering or maneuvering of vessels by the reaction effect of water jets, a well disposed within the vessel with one end opening through the wall of the vessel, a cylindrical casing rotatably mounted in the well, a pump enclosed within the casing and having a water intake opening in the outer end of the casing, means for causing water from the pump to be delivered through the outer end of the casing, means for rotating the casing, a grating over the water intake opening, and a scraper plate fixed to the adjacent wall of the vessel so that the edge of the scraper plate lies near to but out of contact with the end of the casing and is operative when the casing is rotated to remove weed or other substances tending to cling to the grating as set forth.

10. In apparatus for the propulsion, steering or maneuvering of vessels by the reaction effect of water jets, a well disposed within the vessel with one end opening through the wall of the vessel, a cylindrical casing rotatably mounted in the well and containing a complete propulsive unit comprising a pump, a central intake opening for the pump in the outer end of the casing and two delivery passages from the pump leading in the same direction through the outer end of the casing, these passages and their orifices being placed symmetrically about the central intake to effect a balancing of the reactions, this complete propulsive unit being capable of being withdrawn from the well, means for rotating the said casing, a source of power mounted on the cylindrical casing and rotatable therewith, and means for driving the pump from the source of power, the outer end of the pump body which is carried in the casing being formed so as to project beyond the outer surface of the adjacent wall of the vessel to an extent only sufficient to allow the reaction effect of the water delivered to be directed substantially parallel to the surface of the adjacent wall of the vessel as set forth.

11. In apparatus for the propulsion, steering or maneuvering of vessels by the reactive effect of water jets, a well disposed within the vessel with one end opening through the wall of the vessel, a cylindrical casing rotatably mounted in the well and projecting beyond the adjacent wall of the vessel, said casing having water inlet and outlet openings in said projecting portion, pump means for drawing liquid into the casing through the inlet opening and forcing it outwardly through the outlet opening, and means secured to the wall of the vessel for removing weeds, from the casing as it is rotated.

12. In apparatus for the propulsion, steering or maneuvering of vessels by the reactive effect of water jets, a well disposed within the vessel with one end opening through the wall of the vessel, a cylindrical casing rotatably mounted in the well and projecting beyond the adjacent wall of the vessel, said casing having water inlet and outlet openings in said projecting portion, a protective grating for said inlet opening, a pump for drawing water into the casing through the inlet opening and forcing it outwardly through the outlet opening, and means secured to the wall of the vessel for removing weeds from the grating as the casing is rotated.

13. In apparatus for the propulsion, steering or maneuvering of vessels by the reactive effect of water jets, a well disposed within the vessel with one end opening through the wall of the vessel, a cylindrical casing rotatably mounted in the well and projecting beyond the adjacent wall of the vessel, said casing having water inlet and outlet openings in said projecting portion, a protective grating for said inlet opening, a pump for drawing water into the casing through the inlet opening and forcing it outwardly through the outlet opening, and a stationary scraper secured to the wall of the vessel for removing weeds from the grating as the casing is rotated.

In testimony whereof I have signed my name to this specification.

JAMES HERBERT WAINWRIGHT GILL.